UNITED STATES PATENT OFFICE.

EDWIN W. HICKMAN, OF LAKE, WISCONSIN.

IMPROVEMENT IN FIRE-PROOF ROOFING COMPOSITION.

Specification forming part of Letters Patent No. 206,175, dated July 23, 1878; application filed October 15, 1877.

*To all whom it may concern:*

Be it known that I, E. W. HICKMAN, of the town of Lake, in the county of Milwaukee and State of Wisconsin, have invented certain new and useful Improvements in Fire-Proof Composition for Roofing; and I do hereby declare that the following is a full, clear, and exact description thereof, which will enable others skilled in the art to which it appertains to make and use the same.

The object of my invention is to furnish a fire-proof composition for roofing buildings of all descriptions, which is easily applied, durable, economical, and well adapted to the use for which it is intended.

In the preparation of my composition for roofing, I use marble or stone dust, or marble mud, which is a mixture of water and marble or stone dust, it being the waste mud produced in the act of sawing blocks of stone or marble into slats, &c. The same may be produced by grinding and mixing together marble, or stone, or sand with water.

The other ingredients used in my composition are the following: Land-plaster or grindstone-dust, hydrated plaster-of-paris, coal-tar, pine-tar, and plastering-hair.

The proportions which I have found to be best for general use approximate the following formula: Marble or stone mud, one peck; ground sand, one peck; land-plaster or grindstone-dust, one peck; hydrated plaster-of-paris, one-tenth peck; coal-tar, three gallons; pine-tar, one gallon; plastering-hair, one pound.

The process of preparation is as follows: Into any vessel large enough to contain them put all the ingredients, and stir them until they are thoroughly incorporated or mixed together. It is better to add the hair last, little by little, stirring it into the mixture evenly.

The above quantity is sufficient to cover an area of one hundred square feet of roof, over which it should be evenly spread, the roof having been first prepared for the same by covering the boards with the ordinary paper, felting, or canvas used for such purposes. If the roof is to be used to walk upon, it should receive a coating of sand over the composition.

The nature and office of the materials used in my composition for roofing may be described as follows: The marble or stone mud gives body or bulk, and also solidifies and toughens the mass. Land-plaster or grindstone-dust furnishes body. Hydrated plaster-of-paris absorbs water from the mud, then heats and expels the moisture. Coal-tar is the medium for attaching the other ingredients together and to the roof. Pine-tar prevents the mass from becoming too hard and brittle; and plastering-hair strengthens, and also prevents the composition from running down after laying it upon the roof.

In making my composition for roofing, I do not confine myself to the exact proportions above stated, but vary them as my judgment dictates, by using more or less of the dry materials in proportion to the tar, as the climate, pitch of the roof, or use to which the building is to be put may indicate that the composition should be stiffer or softer than for general use.

Having thus described the nature, preparation, and use of my invention, what I claim as new, and desire to secure by Letters Patent, is—

1. A roofing composition containing marble-mud, sand, plaster-of-paris, tar, and hair, substantially as set forth.

2. A roofing composition consisting of marble-mud, sand, hydrated plaster-of-paris, coal-tar, pine-tar, and plastering-hair, substantially in the proportions stated.

In testimony that I claim the foregoing as my own I affix my signature in presence of two witnesses.

EDWIN W. HICKMAN.

Witnesses:
K. SHAWVAN,
C. BEYER.